United States Patent [19]

Um

[11] Patent Number: 4,979,789

[45] Date of Patent: Dec. 25, 1990

[54] CONTINUOUS SOURCE SCENE PROJECTOR

[75] Inventor: Gregory Um, Torrance, Calif.

[73] Assignee: Aura Systems, Inc., El Segundo, Calif.

[21] Appl. No.: 360,315

[22] Filed: Jun. 2, 1989

[51] Int. Cl.$^5$ .......... G02B 6/10; G02B 21/36; H04J 14/00; G09G 3/00

[52] U.S. Cl. .......... 350/96.14; 350/96.11; 350/96.13; 353/39; 353/82; 353/122; 370/1; 370/4; 370/60.1; 340/789; 340/802

[58] Field of Search .......... 350/96.11, 96.12, 96.13, 350/96.15, 96.14, 96.16; 353/39, 82, 122; 370/1, 3, 4, 60, 60.1, 92; 356/345; 382/65, 9, 41; 340/752, 753, 763, 766, 789, 794, 795, 802, 754

[56] References Cited

U.S. PATENT DOCUMENTS

| | | | |
|---|---|---|---|
| 4,601,537 | 7/1986 | Saccocio | 350/96.10 X |
| 4,798,437 | 1/1989 | Rediker et al. | 350/96.14 |
| 4,840,447 | 6/1989 | Kataoka | 350/96.14 |
| 4,866,698 | 9/1989 | Huggins et al. | 370/1 |
| 4,897,671 | 1/1990 | Mahapatra et al. | 350/96.11 X |

FOREIGN PATENT DOCUMENTS 63-68825  3/1988  Japan ............ 350/96.14 X

*Primary Examiner*—Brian Healy
*Attorney, Agent, or Firm*—Poms, Smith, Lande & Rose

[57] ABSTRACT

A scene projector displays an image as M by N array of pixels. The scene projector includes a plurality of optical guided wave modulators. The modulators each have an optical input, and optical output and an electrical input. The optical output of each of the modulators forms a corresponding one of the pixels. The optical input of each of the modulators is adapted to be uniformly illuminated. The scene projector further applies a selected voltage to the electrical input of each of the modulators. This voltage is selected commensurately with a predetermined intensity of output optical energy at the corresponding pixel.

8 Claims, 2 Drawing Sheets

CONTINUOUS SOURCE SCENE PROJECTOR

SUMMARY OF THE INVENTION

A novel scene projector, constructed according to the principles of the present invention, displays an image as M by N array of pixels. The scene projector includes a plurality of optical guided wave modulators. The modulators each have an optical input, and optical output and an electrical input. The optical output of each of the modulators forms a corresponding one of the pixels. The optical input of each of the modulators is adapted to be uniformly illuminated. The novel scene projector further includes means for applying a selected voltage to the electrical input of each of the modulators. This voltage is selected commensurately with a predetermined intensity of output optical energy at the corresponding pixel.

A particular advantage of the present invention is that optical modulators have very high switching speeds compared to the switching speeds of liquid crystal light valves. Therefore, movement occurring in the images may be obtained and displayed in real time. These and other objects, advantages and features of the present invention will become more apparent to those skilled in the art from a study of the following description of an exemplary preferred embodiment when read in conjunction with the attached drawings and dependent claims.

DESCRIPTION OF AN EXEMPLARY PREFERRED EMBODIMENT

Figure 1:
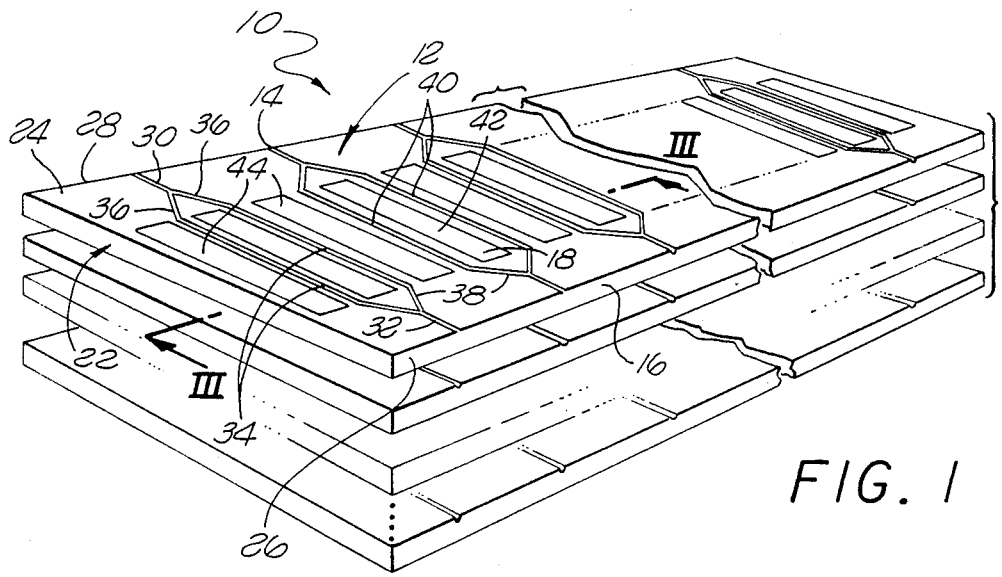
FIG. 1 is an exploded view of the optical portion of a continuous source scene projector constructed according to the principles of the present invention.
Figure 2:
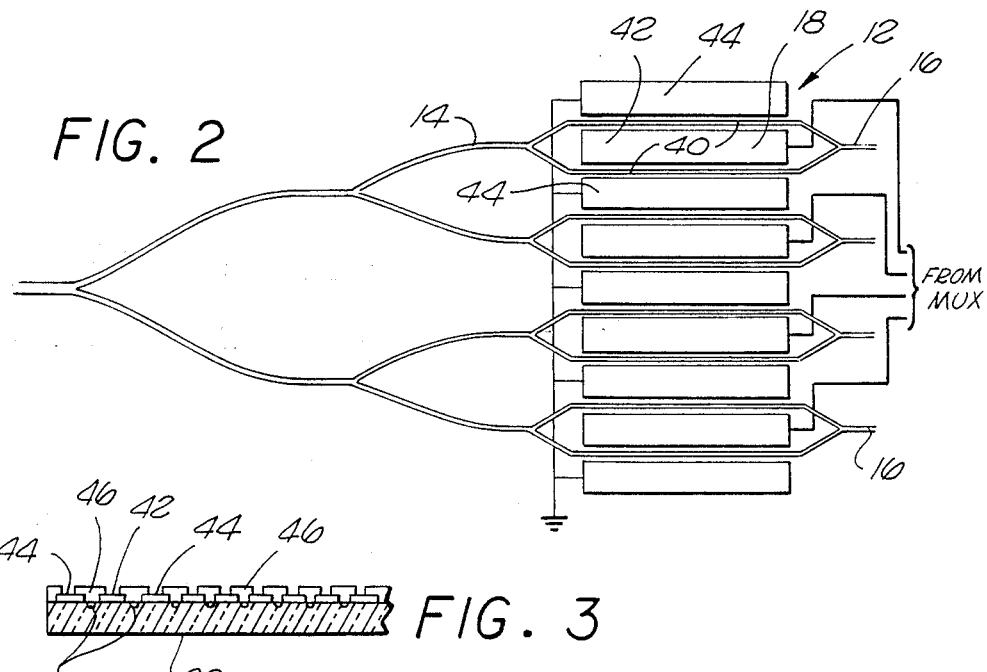
FIG. 2 is a schematic diagram of the scene projector of FIG. 1.

Referring now to FIGS. 1 and 2, there is shown a continuous source scene projector 10 constructed according to the principles of the present invention. The scene projector 10 includes a plurality of optical guided wave modulators 12. Each of the modulators 12 has an optical input 14, an optical output 16 and an electrical input 18. Where the continuous source scene projector 10 of the present invention displays as an M by N array of pixels, the optical output 16 of each of the modulators 12 forms a corresponding one of those pixels. The optical input 14 of each of the modulators is adapted to be uniformly illuminated.

Figure 5:
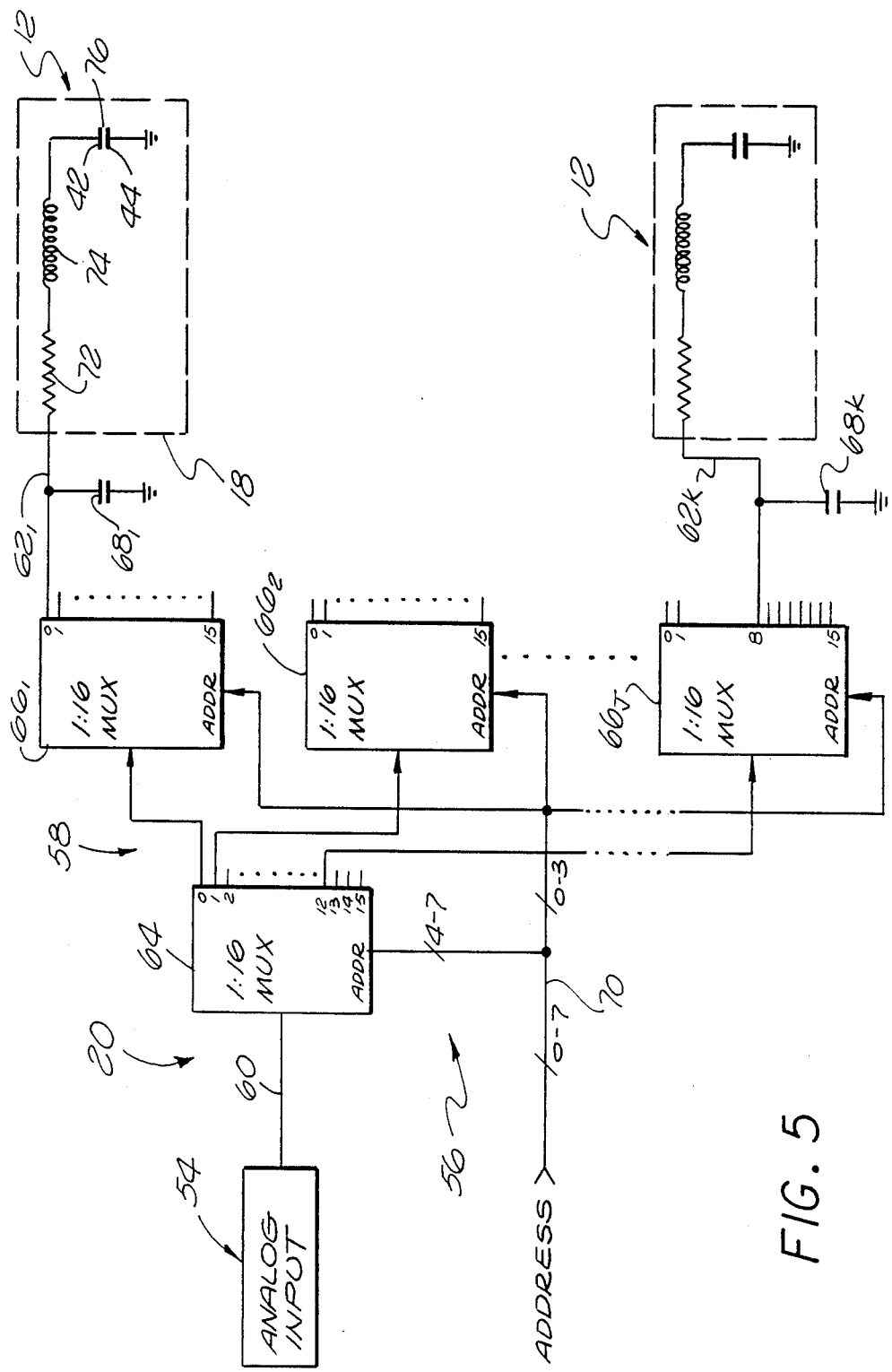
FIG. 5 is a schematic block diagram of the electronic portion of the continuous source scene projector constructed according to the principles of the present invention.

With further reference to FIG. 5, the scene projector 10 includes means 20 for applying a selected voltage to the electrical input 18 of each of the modulators 12. This voltage is selected commensurately with a predetermined intensity of output optical energy at a corresponding one of the pixels or optical outputs 16. In FIG. 5, the electrical input 18 is shown as an equivalent circuit as described in greater detail herein.

Returning with particular reference to FIG. 1, the scene projector 10 includes a N number of substrates 22. Each of the substrates 22 includes a M number of the modulators 12 formed therein. As best seen in FIG. 1, each of the substrates 22 are in a stacked relationship to each other. Each substrate 22 has a surface 24, a forward edge 26 and a rearward edge 28.

To form each of the modulators 12 in the surface 24 of each substrate 22, each modulator 12 includes a diffused first channel 30, a diffused second channel 32, and a pair of diffused third channels 34. The first channel 30 is adapted to form the optical input 14. The second channel extends to the forward edge 26 of the substrate 22 to form the optical output 16. Each of the third channels 34 has a first end portion 36, a second end portion 38 and a middle portion 40. The middle portion 40 is interposed between the first end portion 36 and the second end portion 38 of each of the third channels 34. Furthermore, each middle portion 40 is spaced from each other in a generally parallel relationship. The first end portion 36 of each of the third channels 34 converges to the first channel 30. The second end portion 38 of each of the third channels 34 converges to the second channel 32.

To form the electrical input 18 of each modulator 12, the modulator 12 also includes an electrically conductive first layer 42 and pair of electrically conductive second layers 44. The conductive first layer 42 is formed on the surface 20 between the middle portion 40 of each of the third channels 34 and adjacent thereto. The conductive second layers are formed on the surface 24 and disposed adjacent a corresponding one of each middle portion 40 opposite from the first layer 42. The voltage being applied to the modulator 12 is between the first layers 42 and the second layers 44, as best seen in FIG. 2.

Figure 3:
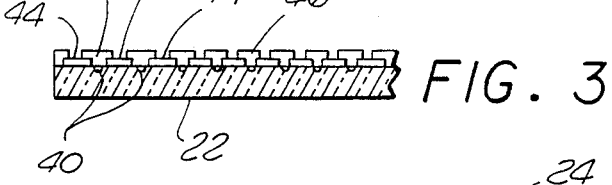
FIG. 3 is a view, broken away, taken along line 3—3 of FIG. 1.

With particular reference to FIG. 3, to make the electrical connections to the conductive first layers 42 and conductive second layers 44, an oxide or other type of insulative layer 46 may be deposited on the surface 24 of the substrate 22 and etched to expose the conductive layers 42 and 44. Conventional processing techniques may then be utilized to form electrical traces extending to the edges of the substrate 22 to make the electrical connections schematically represented in FIG. 2.

Figure 4:
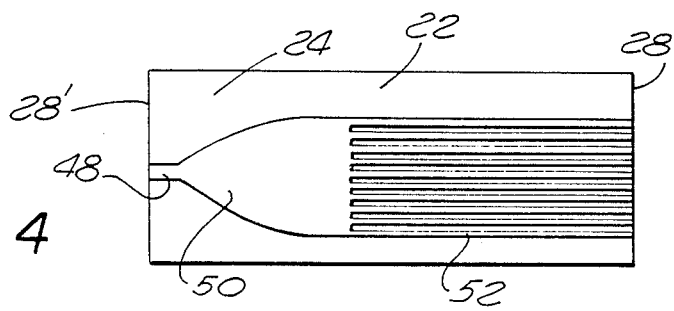
FIG. 4 is a plan view of an optical wave guide used to couple optical energy to the scene projector of FIG. 1.

With particular reference to FIG. 4, to illuminate the optical input 14 of each of the modulators 12, the substrate 22 may be extended at its rearward edge 28 to form a rearward edge 28'. The substrate may then include a diffused fourth channel 48 in the surface 24 extending from the extended rearward edge 28'. The substrate 22 may further include a horn-shaped diffused fifth channel 50 diverging from the fourth channel 48. A plurality of diffused sixth channels 52 extend generally parallel to each other and outwardly from the horn-shaped fifth channel 50. Each of the sixth channels 52 is coupled to the first channel 30 of an associated one of the modulators 12. The fourth channel 48 is illuminated to have optical energy propagate to the horn-shaped fifth channel 50. The horn-shaped fifth channel 50 then uniformly distributes the optical energy to each of the sixth channels 52 thereby illuminating the optical input 16 of the modulators 12. The illuminating ligh source need not sweep the rearward edge 28' of each substrate, but may be a continuous illumination. However, the wave guide channels in the surface 24 are dimensional so that only the lowest order TE mode is propagated.

In one embodiment of the present invention, the substrates 22 may be constructed from lithium niobate (LiNbO$_3$) crystals. Each of the diffused channels therein are formed by diffusing titanium (Ti) in the lithium niobate crystals using conventional lithographic techniques.

With particular reference to FIG. 5, the selected voltage applying means 20 includes means 54 for developing an analog signal wherein the analogs signal is a succession of voltage levels. Each of the voltage levels is the selected voltage for the corresponding ones of the pixels. Applying mean 20 further includes means 56 for switching each of the voltage levels to the electrical input 18 of the modulators 12 associated with the corresponding one of the pixels.

To develop the analog signal, developing means 54 may include a video frame which is digitized and stored in computer memory in a known conventional manner. Each digital word in the memory may then represent an intensity of optical energy at a corresponding pixel. The memory may then be accessed wherein the stored digitized words are outputted in succession. The succession of digitized words are then applied to a digital to analog (D/A) converter. The D/A converter then develops the hereinabove described analog signal developed by developing means 54.

Switching means 56 includes a 1:K multiplexor circuit 58 wherein $K=M\times N$. The 1:K multiplexor circuit 58 is responsive to a plurality of successive address signals wherein each of the address signals uniquely identifies one the modulators 12. The multiplexor circuit 58 has a data input 60 to which the analog signal is applied and K outputs $62_{1-K}$ are electrically coupled to the electrical input 18 of a corresponding one of the modulators 12. The multiplexor circuit 58, in response the address signals switches the analog signal applied to the data input 60 to one of the K output $62_{1-K}$ corresponding to one of the modulators 12 currently identified by the address signals.

More particularly, the multiplexor circuit 58 includes the first 1:16 multiplexor 64, a plurality of second multiplexor $66_{1-J}$ and plurality of capacitors $68_{1-K}$. The first multiplexor 64 has the analog signal applied thereto. The high order address bits, represented by bit lines 4–7 of an 8 bit address bus 70 having bit line 0–7 are also applied to the first multiplexor 64. Each of the second multiplexors $66_{1-J}$ are coupled to a different one of the outputs of the first multiplexor 64. The low order address bit, represented by the low order bit lines 0–3 of the 8 bit address bus 70, are coupled to each of the address inputs of the second multiplexor $66_{1-J}$. Each of the capacitors $68_{1-K}$ are coupled between the utilized outputs of the multiplexor $66_{1-J}$ and ground potential.

In the embodiment shown in FIG. 5, there are thirteen second multiplexors $66_{1-J}$, or $J=13$. Also, each of the outputs of the first twelve multiplexors $66_{1-12}$ are utilized, only eight outputs of the thirteenth multiplexor $66_{1-J}$ are utilized such that there are 200 outputs. $66_{1-K}$, or $K=200$. These values are not to be taken as a limitation upon the present invention but are used to describe a pixel array of 100×20 or $M=100$ and $N=20$.

The electrical input 18 is shown in its equivalent circuit and includes a relatively large leakage resistor 72, a parasitic inductance 74 and a capacitor 76 formed between the first conductive layer 42 and the second conductive layer 44. The value of the capacitor $68_{1-K}$ is chosen so that there is enough time to charge the capacitor $68_{1-K}$ at the analog input frequency which includes switching device to the analog multiplexors. For example, the analog input frequency may be selected to be 1 mHz and RC time constant which is the resistance of resistor 72 summed with the resistance to the multiplexor 64 and $66_{1-J}$ and the equivalent capacitance which is the sum of the capacitance of capacitors $68_{1-K}$ and capacitor 76 should be in the order of 100 ns. After the capacitor is charged, it will hold its charge since there is no path to discharge the capacitor since this connection to the output of the multiplexor $66_{1-J}$ becomes open.

As the analog signal developing means 54 outputs digital data from a stored memory and converts it to successive a string of analog voltage levels at 1 mHz as described above, the address signals may be developed by a counter. Accordingly, for the number of multiplexors shown in FIG. 5, an 8 bit address bus 70 is required to provide for at least 200 separate addresses. Therefore, the counter need only be a 200 count ring counter.

There has been described here and above, a novel continuous source scene projector for displaying an image in a M×N array of pixels. It should be obvious that those skilled in the art may now make numerous uses of and departures from the hear and above description of the preferred exemplary embodiment without departing from the inventive concept disclosed herein. Accordingly, the present invention is to be defined solely by the scope of the following claims.

I claim:

1. A continuous source scene projector for displaying an image as a two dimensional array of M×N pixels comprising:
   means for generating voltages, said voltages being proportionate to received light intensities of the image to be displayed, each of said voltages corresponding to a pixel of the image;
   a plurality of optical guided wave modulators for modulating light in response to an applied voltage, each of said modulators having an optical input, an optical output and an electrical input, said optical output of each of said modulators forming a corresponding one of said M×N pixels, said optical input of each of said modulators being adapted to be uniformly illuminated; and
   means for applying a corresponding, generated voltage to said electrical input of each of said modulators, said voltage value being selected commensurately with the predetermined intensity of output optical energy at said corresponding one of said pixels,
   each of the M×N modulators outputting a level of said uniform illumination proportionate to the required intensity of the corresponding pixels of the image.

2. A scene projector as set forth in claim 1, further comprising:
   a N number of substrates, each of such substrates including M number of said modulators formed therein, said substrates being in a stacked relationship to each other, each of said substrates having a surface, a forward edge and a rearward edge.

3. A scene projector as set forth in claim 2 wherein each of said modulators includes:
   a diffused first channel in said surface of said substrate, said first channel being adapted to form said optical input;

a diffused second channel in said surface of said substrate, said second channel extending to said forward edge to form said optical output;

a pair of diffused third channels, each of said third channels having a first end portion, a second end portion and an elongated middle portion interposed said first said first end portion and second end portion, said middle portion of each of said third channels being spaced from each other in the generally paralleled relationship, said first end portion of each of said third channels converging to said first channel, said second end portion of said third channels converging to said second channel;

an electrically conductive first layer formed on said surface between said middle portion of each of said third channels and adjacent thereto; and a pair of electrically conductive second layers formed on said surface, each of said second layers being disposed adjacent to corresponding one of each middle portion opposite from said first layer, said voltage being applied between said first layer and second layers.

4. A scene projector as set forth in claim 3 wherein said substrates are lithium niobate crystals.

5. A scene projector as set forth in claim 4 wherein said first channel, said second channel and said third are diffused titanium (Ti) in said lithium niobate.

6. A scene projector as set forth in claim 3 wherein each of said substrates further includes:

a diffused fourth channel in said surface extending from said rearward edge;

a horn-shaped diffused fifth channel diverging said fourth channel;

a number of diffused sixth channels radiating from said horn-shaped fifth channel, said sixth channels terminating at said first channel of selected ones of said modulators to uniformly distribute optical energy to said optical input of said selected ones of said modulators, said number being greater than two.

7. A scene projector as set forth in claim 1 wherein said applying means includes:

means for switching each of said voltage levels to said electrical input of one of said modulators associated with said corresponding one of said pixels.

8. A continuous source scene projector for displaying an image as a two dimensional array of $M \times N$ pixels comprising:

a plurality of optical guided wave modulators, each of said modulators having an optical input, an optical output and an electrical input, said optical output of each of said modulators forming a corresponding one of said pixels, said optical input of each of said modulators being adapted to be uniformly illuminated; and means for applying a selected voltage to said electrical input of each of said modulators, said voltage being selected commensurately with the predetermined intensity of output optical energy at said corresponding one of said pixels, said applying means including means for developing an analog signal being a succession of voltage levels, each of said voltage levels being said selected voltage for said corresponding one of said pixels, and means for switching each of said voltage levels to said electrical input of one of said modulators associated with said corresponding one of said pixels, said switching means including a 1:K multiplexor circuit wherein $K = M \times N$ and being responsive to a plurality of successive address signals wherein each of said address signals uniquely identify one of said modulators, said multiplexor circuit having K outputs and a data input into which analog signals are applied, each of said K outputs being electrically coupled to said electrical input of the corresponding one of said modulators, said multiplexor, in response to said address signals, coupling said analog signal so as to apply to said data input one of said K outputs corresponding to one of said modulators currently identified by said address signals.

* * * * *